United States Patent [19]

Bauer

[11] Patent Number: 5,657,225
[45] Date of Patent: Aug. 12, 1997

[54] METHOD FOR ASSURING A SAFETY INTERVAL OF A SELF-PROPELLED MOBILE UNIT

[75] Inventor: Rudolf Bauer, Neubiberg, Germany

[73] Assignee: Siemsns Aktiengesellschaft, Munich, Germany

[21] Appl. No.: 426,692

[22] Filed: Apr. 21, 1995

[30] Foreign Application Priority Data

Apr. 22, 1994 [DE] Germany ............... 44 14 192.0

[51] Int. Cl.$^6$ ........................................... G06G 7/76
[52] U.S. Cl. ........................ 364/424.027; 364/461
[58] Field of Search ................. 364/424.01, 424.02, 364/460, 461, 424.027, 424.029; 180/167, 168, 169; 318/587; 340/435

[56] References Cited

U.S. PATENT DOCUMENTS 5,006,988  4/1991  Borenstein et al. ............... 364/424.02
5,170,352  12/1992  McTamaney et al. ............... 364/424.02

OTHER PUBLICATIONS

IEEE Transactions on Robotics Automation, vol. 7, No. 4, Aug. 1991, "Histogrammic Motion Mapping for Mobile Robot Obstacle Avoidance", J. Borenstein and Yoram Koren, pp. 535–539.

Primary Examiner—Michael Zanelli
Attorney, Agent, or Firm—Hill, Steadman & Simpson

[57] ABSTRACT

The method provides a better incorporation of a defined safety interval from obstacles in the route planning of a self-propelled mobile unit. By contrast to methods that were hitherto standard, a shell with equidistant spacing from a housing of the self-propelled mobile unit is not placed around the mobile unit; rather, the safety interval is calculated via the route at a drive wheel of the self-propelled mobile unit. That is, the kinematics of the self-propelled mobile unit are first used in the calculation of the safety interval from obstacles. The advantage is that better maneuverability is achieved between obstacles located close to one another.

20 Claims, 4 Drawing Sheets

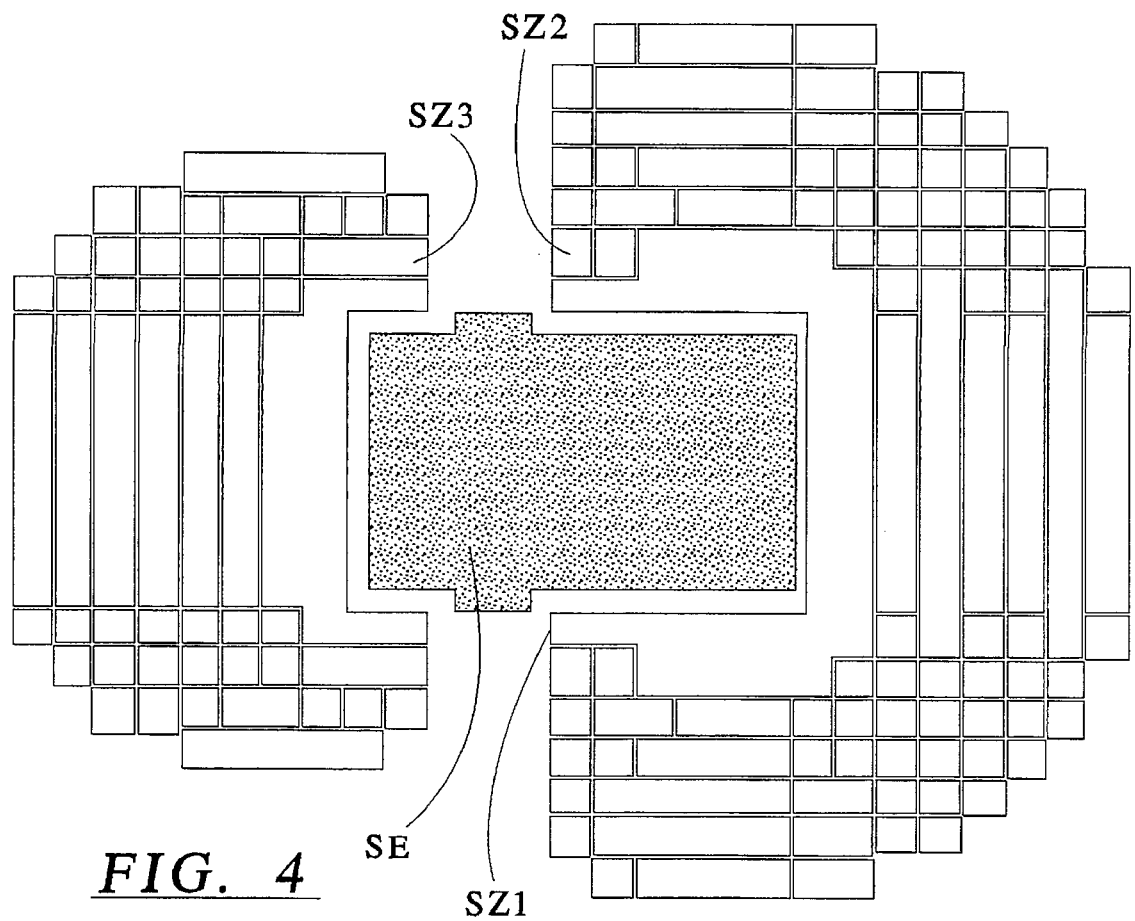

METHOD FOR ASSURING A SAFETY INTERVAL OF A SELF-PROPELLED MOBILE UNIT

BACKGROUND OF THE INVENTION

There are currently numerous possibilities for using autonomously operating mobile units. The uses of such mobile units include remote reconnaissance probes, mobile units that operate in dangerous areas, self-propelled industrial vacuum cleaners, transport vehicles in manufacturing and, last but not least, self-propelled robots. In order, however, to be able to carry out a meaningful job in an environment that is unknown a priori, an autonomous, mobile robot must both construct step-by-step a reliable map of its work environment and must also be able to localize itself with reference to this map at any given point in time. As a consequence of the extremely complex and unstructured environments in which such self-propelled units may be required to maneuver, their areas of use have been frequently limited to office and household environments. Since an a priori map is generally not available, such a self-propelled unit must be equipped with sensors which make it possible for the unit to flexibly interact with its environment. A few such sensors are, for example, laser range scanners, video cameras and ultrasound sensors.

A particular drawback of these mobile units is that the formation of the environment map and the localization of the mobile unit are dependent on one another. This results in the occurrence of various errors. First, such a prior art mobile unit measures the distance it has traversed from a starting position; second, it measures the distance from occurring obstacles with range sensors and enters these measurements into the environment map as landmarks. Since these errors accumulate and sum over longer distances, a meaningful maneuverability of the mobile unit is no longer established beyond a certain limit.

One method for the orientation of self-propelled mobile units in unknown environments is that the unit constructs a two-dimensional grid of its environment and provides individual cells of this grid with occupation values. The occupation values assigned per grid cell represent the occurrence of obstacles in the environment. Such a method of orientation of self-propelled units in grid maps is described in the publication "Histogrammic in Motion Mapping for Mobile Robot Obstacle Avoidance", IEEE Transactions on Robotics Automation, Vol. 7, No. 4, August 1991 by J. Borenstein and Yoram Koren.

Another problem results from the requirement of a necessary safety interval from articles in the environment. The route planning of the mobile unit is essentially defined by the maneuverability thereof, by the selected destination and by the obstacles on the route. The safety interval to be observed must be of such a nature that it impedes the mobility of the mobile unit to the least possible extent, so that it also remains maneuverable between obstacles located close to one another.

SUMMARY OF THE INVENTION

It is an object of the present invention to provide a method wherewith an optimal safety interval is assured of a self-propelled mobile unit from obstacles within the environment.

In general terms the present invention is a method for controlling a self-propelled mobile unit, comprising the steps of: providing the self-propelled mobile unit with motion kinematics as a function of drive and steering properties of the mobile unit; and calculating via the motion kinematics a safety interval to be observed between the mobile unit, when moving, and an obstacle, the safety interval being prescribed as travel distance of the unit for traversing the safety interval.

Advantageous developments of the present invention are as follows.

The method further comprises calculating a safety zone around the self-propelled mobile unit with the steps of: providing a starting position and a starting steering angle of the self-propelled mobile unit; calculating and noting for a plurality of steering angles between 0° and 360°, via the motion kinematics after at least forward travel of the mobile unit from the starting position and based on the safety interval as a constant travel distance, an ultimate position of the self-propelled mobile unit; determining, taking a contour line of the self-propelled mobile unit into consideration, the safety zone associated with the starting position of the self-propelled mobile unit is determined as joined sets of areas that are framed by a contour line of respective final positions of the unit.

The safety zone is calculated only once for a respective, prescribed safety interval and is carried along by the mobile unit when moving.

The safety zone comprises a front safety zone in front of the self-propelled mobile unit, the front safety zone being calculated by forward travel of the mobile unit, and a rear safety zone behind the self-propelled mobile unit, the rear safety zone being calculated by traveling of the mobile unit in reverse.

The method further comprises the steps of: providing a cellularly structured map having cells, and determining occupied cells in the cellularly structured environment map which can be reached by movement of the mobile unit by the safety interval.

In one embodiment the motion kinematics is a three-wheel kinematics.

The method further comprises route planning for the self-propelled mobile unit using the safety interval to avoid collisions with obstacles by self-propelled mobile unit.

A particular advantage of the method of the present invention is that it is not necessary to assure a safety interval to obstacles via equidistant shells that are placed around the housing of the self-propelled mobile unit. According to the present invention the travel distance for traversing the safety interval that is calculated by the kinematics of the self-propelled mobile unit is prescribed as a minimum distance.

A further advantage of the inventive method is that a safety zone can be placed around the self-propelled mobile unit via trigonometric functions by variation of the steering angle, upon incorporation of a safety interval and by calculating the traversed distance. This calculating procedure is in fact complicated, but need ensue only once. Given movement of the self-propelled mobile unit, this calculated safety zone can subsequently be translated, for example together with the unit, into a cellularly structured environment map of the unit.

Another advantage in the calculation of the safety zone for a self-propelled mobile unit derives in that, for example given an asymmetrical unit, the safety zone in front of the unit is calculated by traveling forward and the safety zone behind the unit is calculated by traveling in reverse.

It is especially advantageous given a self-propelled mobile unit that constructs a cellular environment map by itself to calculate all those cells that can be reached within a safety interval. The calculating outlay for the route planning and the obstacle avoidance is thus reduced.

Use of the inventive method is especially beneficial given three-wheel vehicles. Three-wheel kinematics has been exhaustedly investigated and frequently utilized.

The inventive method can also be advantageously utilized in self-propelled mobile units to avoid collision with obstacles. By taking the specific kinematics in the propulsion of the self-propelled mobile unit into consideration and by preserving the safety interval, an improved maneuverability of the self-propelled mobile unit can be achieved between obstacles standing close to one another.

An arrangement for assuring a safety interval given a self-propelled unit that contains two different sensors is advantageous, whereby one sensor measures the traversed distance based on wheel revolutions and the other sensor identifies the distance to obstacles. A control unit at the self-propelled mobile unit, which undertakes the route planning, can compare the two sensor data and, given knowledge of the geometry and of the kinematics of the unit, can fashion the route planning by applying trigonometric functions such that the safety interval is preserved of the self-propelled mobile unit from obstacles on the route.

BRIEF DESCRIPTION OF THE DRAWINGS

The features of the present invention, which are believed to be novel, are set forth with particularity in the appended claims. The invention, together with further objects and advantages may best be understood by reference to the following description taken in conjunction with the accompanying drawings, in the several Figures of which like reference numerals identify like elements, and in which:

FIG. 4 shows an example of a self-propelled mobile unit with safety zones;

FIGS. 5–7 provide an example of a use of the inventive method in a cellularly structured environment map.

DESCRIPTION OF THE PREFERRED EMBODIMENTS

Figure 1:
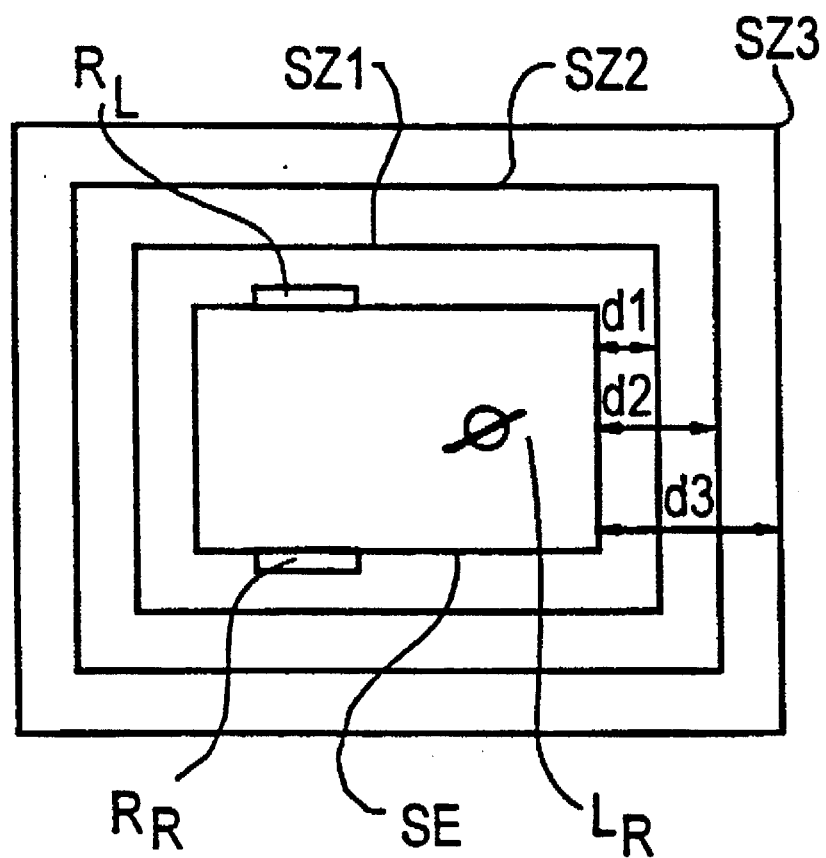
FIG. 1 shows a self-propelled mobile unit.

FIG. 1 shows a self-propelled mobile unit SE with a three-wheel geometry. This self-propelled mobile unit has a right wheel $R_R$ and a left wheel $R_L$ and can be maneuvered by a steering wheel $L_R$. Three safety intervals D1–D3 are also shown in FIG. 1 by way of example, these being oriented based on the contour line of the self-propelled mobile unit. These safety intervals correspond to safety zones that are placed shell-like around the self-propelled mobile unit SE. The safety zones SZ1–SZ3 refer to correspondingly referenced safety intervals. It is not critical to the method of the present invention whether a three-wheel kinematics or whether some other kinematics is employed. It is also of no significance whether the rear wheels or the steering wheel are driven.

Figure 2:
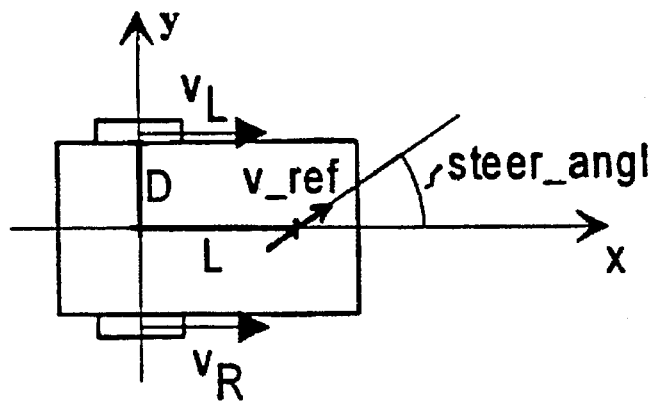
FIG. 2 shows one example of a kinematics of a self-propelled mobile unit.

FIG. 2 shows an example of the kinematics of a self-propelled mobile unit. Three-wheel kinematics with two driven rear wheels was selected here. The steering wheel is thereby fashioned as a passive tracking wheel. The wheel distance of the driven wheels from the coordinate origin amounts to D and the distance of the steering wheel from the coordinate origin amounts to L. The coordinates are thereby recited as x and y. A velocity $V_R$ can be prescribed at the right wheel and a velocity $V_L$ can be prescribed at the left wheel. The vector sum of the two velocities derives as v_ref at the steering wheel. The mobile unit has a steering angle STE.

For example, the steering angle STE and the velocity v_ref are prescribed by a controller of the self-propelled mobile unit. The velocities $v_L$ and $v_R$ that are to be set by the drive motors at the corresponding wheels can be calculated via the geometry of the self-propelled mobile unit. The values STE and v_ref are forwarded to the motor control function. The robot then drives as though the passive tracking wheel were driven and steered.

To this end, the corresponding wheel velocities $v_L$ and $v_R$ must be calculated.

$$V_L = v\_ref * (\cos(STE) - ^D/L \sin(STE))$$

$$V_R = v\_ref * (\cos(STE) + ^D/L \sin(STE))$$

Figure 3:
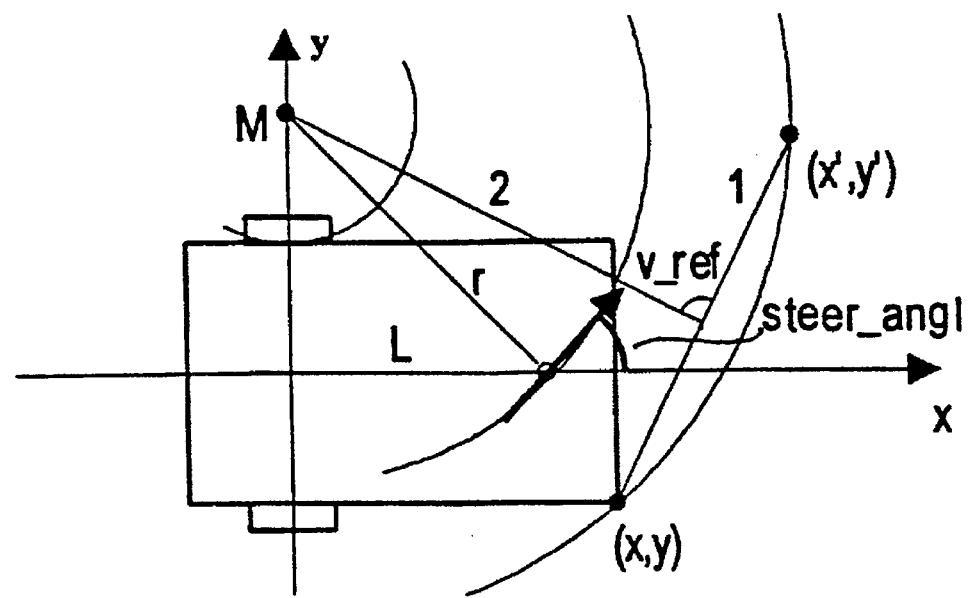
FIG. 3 depicts three-wheel kinematics.

FIG. 3 explains the calculating bases of the inventive method with reference to a three-wheel kinematics. For example, let the unit here be a robot. The drive of the motors just set forth in FIG. 2 leads to a description of the robot by the three-wheel kinematics. All robot points turn around the mid point (O, M) when a fixed steering angle STE, θ is set.

$$M = \frac{L}{\tan(\theta)}$$

When an arbitrary robot point (x, y) is to move on a circular path toward an arbitrary point (x', y') in the environment, then the appertaining STE θ is:

$$\theta = \arctan \frac{2L \cdot (y' - y)}{x'^2 + y'^2 - x^2 - y^2}$$

For categorizing the steering angle θ, a perpendicular line (2) to the connecting line (1) of the robot point (x, y) and the environmental point (x', y') is taken. The intersection of the perpendicular line (2) with the y-axis yields the pivot point M. So that the steering wheel (tracking wheel) also describes a circular arc around the middle point M, the setting of the steering wheel must be perpendicular to the radius r.

FIG. 4 shows a self-propelled mobile unit SE with safety zones that are placed shell-like around the self-propelled unit. These safety zones SZ1–SZ3 were calculated in that a constant safety interval for the respective safety zone was prescribed, for example in the controller of the self-propelled mobile unit. The distance that the self-propelled mobile unit SE would traverse dependent on various steering angles, if it were to move from its starting point by the respective safety interval, was calculated via the kinematics of the self-propelled mobile unit. The joinder of sets of the areas enclosed by the contour line of the unit in its respective ultimate positions after moving by the safety interval yields the respective safety zones.

If the self-propelled mobile unit orients itself using a cellularly structured environment map which is kept constantly up-to-date as warranted in a control unit on the basis of the evaluation of continuously acquired sensor data, the following procedure, for example, is available. For the route planning, only those occupied grid cells are taken into consideration that are located in the immediate proximity of the unit. This measures safe calculating time and prevents a specific steering angle from being forbidden by an occupied grid cell at a greater distance, even though this steering angle would still be permissible for traveling maneuvers in the near range of the unit. For every occupied grid cell, for example, the minimum distance which the unit must travel until it encounters this grid cell at the very earliest is calculated. The steering angle is thus selected such that the unit reaches the grid cell on the shortest path as a consequence of its kinematics. FIG. 4 shows the cells that are taken into consideration in the route planning, by way of example. The marking of these cells marks their affiliation to various safety zones SZ1–SZ3. The moving mobile unit can collide sooner with a cell when it travels a more darkly inked cell.

The safety interval that is prescribed by all of the illustrated cells is less than 45 cm. The black grid cells in the immediate proximity of the robot mark the safety zone SZ1 for a minimum safety interval of, for example, 15 cm. Those cells that lie along the drive axis of the mobile unit need not be taken into consideration for obstacle avoidance, since the robot would only reach these after prolonged turning in place because of its kinematics.

FIG. 5 recites an example of how the safety interval of a self-propelled mobile unit from a cell in a cellular environment map can be observed according to the inventive method. As shown in FIG. 5, the environs of the mobile unit are divided, for example, into ten sectors S1 through S10 for the calculations to assure a safety interval hit. The center of a grid cell i has the coordinates $(x_i, y_i)$ for the following example.

Valid for the regions S1 and S4 are:

region S1: hit=$X_i-X_F$ region S4: hit=$X_R-X_i$

The subdivision into ten regions is implemented here only for demonstration purposes. Fewer regions can also be selected without negative influence on the present invention. For example, the number and shape of the regions is dependent on what strategy is applied in the route planning and on the kinematics that the unit exhibits.

Figure 6:
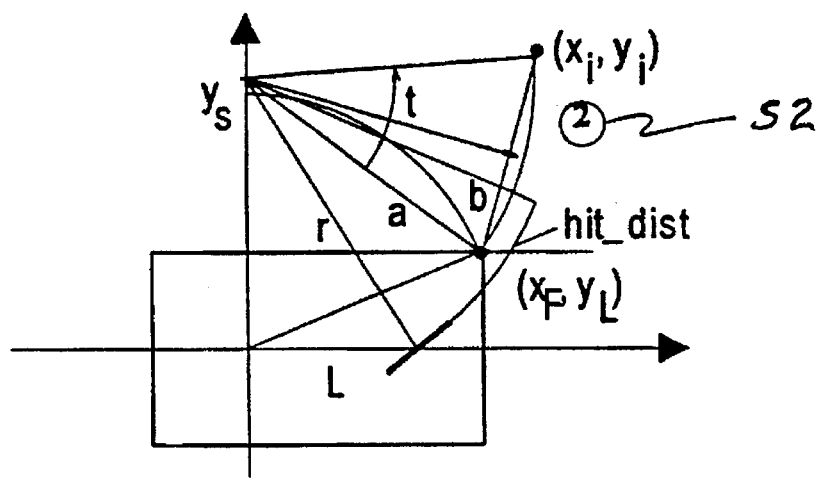

FIG. 6 shows an exemplary calculation for preserving the safety interval in a specific region of a cellular environment map. Similar prerequisites are thereby valid for regions S2, S3, S5 and S6. An exemplary calculation for the region S2 shall be implemented below, this being illustrated in FIG. 6.

Valid are:

$$y_s = \frac{x_i^2 = y_i^2 - x_F^2 - y_L^2}{2(y_i - y_L)}$$

$$b = \frac{1}{2} \sqrt{(x_i - x_F)^2 + (y_i - y_L)^2}$$

$$a = \sqrt{(y_s - y_L)^2 + x_F^2}$$

$$t = 2 \left| \arcsin\left(\frac{b}{a}\right) \right|$$

$$r \sqrt{y_s^2 + L^2}$$

$$hit = r^*t$$

The term "hit" is always the distance that the mobile unit must traverse, dependent on its kinematics, up to an occupied grid cell.

Figure 7:
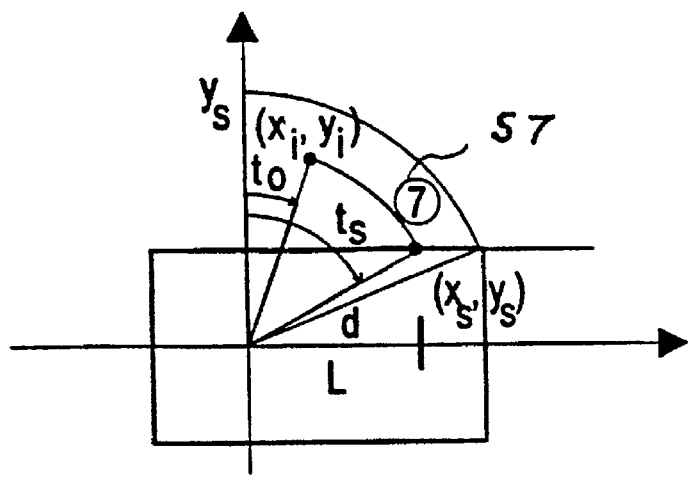

FIG. 7 shows an exemplary calculation for preserving a safety interval from a another region of a cellularly structured environment map of the self-propelled mobile unit. Similar preconditions are valid for the regions S7, S8, S9 and S10. An exemplary calculation for the region S7 shall be implemented below, this being illustrated in FIG. 7.

When it rotates in place (STE=±π/2), the robot collides with an occupied cell on the shortest path given a constant steering angle. That point of the circumferential line of the unit that touches the obstacle $(x_i, y_i)$ first is referenced $(x_s, y_s)$.

Valid are:

$$x_s = \sqrt{d^2 - y_L^2}$$

$$y_s = y_L$$

$$t_o = \left| \arctan\left(\frac{x_o}{y_o}\right) \right|$$

$$t_s = \left| \arctan\left(\frac{x_s}{y_s}\right) \right|$$

$$hit = r^*|t_s - t_o|$$

Here, too, the term "hit" denotes the distance that the mobile unit must traverse, dependent on its kinematics, up to the occupied grid cell.

The present invention is not limited to the particular details of the method depicted and other modifications and applications are contemplated. Certain other changes may be made to the above described method without departing from the true spirit and scope of the invention herein involved. It is intended, therefore, that the subject matter in the above depiction shall be interpreted as illustrative and not in a limiting sense.

What is claimed is:

1. A method for controlling a self-propelled mobile unit, comprising the steps of:

providing the self-propelled mobile unit with motion kinematics as a function of drive and steering properties of the mobile unit; and calculating via the motion kinematics a safety interval to be observed between the mobile unit, when moving, and an obstacle, the safety interval being prescribed as travel distance of the unit for traversing the safety interval; and controlling the self-propelled mobile unit not to move closer to an obstacle than said safety interval.

2. The method according to claim 1, wherein the method further comprises calculating a safety zone around the self-propelled mobile unit with the steps of:

providing a starting position and a starting steering angle of the self-propelled mobile unit;

calculating and noting for a plurality of steering angles between 0° and 360°, via the motion kinematics after at least forward travel of the mobile unit from the starting position and based on the safety interval as a constant travel distance, a final position of the self-propelled mobile unit;

determining, taking a contour line of the self-propelled mobile unit into consideration, the safety zone associated with the starting position of the self-propelled mobile unit as joined sets of areas that are framed by a contour line of respective final positions of the unit.

3. The method according to claim 2, wherein the safety zone is calculated only once for a respective, prescribed safety interval and is carried along by the mobile unit when moving.

4. The method according to claim 2, wherein the safety zone comprises a front safety zone in front of the self-propelled mobile unit, the front safety zone being calculated by forward travel of the mobile unit, and a rear safety zone behind the self-propelled mobile unit, the rear safety zone being calculated by traveling of the mobile unit in reverse.

5. The method according to claim 1, wherein the method further comprises the steps of: providing a cellularly structured map having cells, and determining occupied cells in the cellularly structured environment map which can be reached by movement of the mobile unit by the safety interval.

6. The method according to claim 1, wherein the motion kinematics is a three-wheel kinematics.

7. The method according to claim 1, wherein the method further comprises route planning for the self-propelled mobile unit using the safety interval to avoid collisions with obstacles by the self-propelled mobile unit.

8. A method for controlling a self-propelled mobile unit, comprising the steps of:

providing the self-propelled mobile unit with predetermined motion kinematics related to drive and steering properties of the mobile unit; and calculating via the motion kinematics at least one safety interval to be observed between the mobile unit, when moving, and an obstacle, the at least one safety interval being prescribed as travel distance of the unit for traversing the at least one safety interval; and controlling the self-propelled mobile unit not to move closer to an obstacle than said safety interval.

9. The method according to claim 8, wherein the method further comprises calculating at least one safety zone around the self-propelled mobile unit with the steps of:

providing a starting position and a starting steering angle of the self-propelled mobile unit;

calculating and noting for a plurality of steering angles between 0° and 360°, via the motion kinematics after at least forward travel of the mobile unit from the starting position and based on the at least one safety interval as a constant travel distance, a final position of the self-propelled mobile unit;

determining, taking a contour line of the self-propelled mobile unit into consideration, the at least one safety zone associated with the starting position of the self-propelled mobile unit as joined sets of areas that are framed by a contour line of respective final positions of the unit.

10. The method according to claim 9, wherein the at least one safety zone is calculated only once for a respective, prescribed safety interval and is carried along by the mobile unit when moving.

11. The method according to claim 9, wherein the at least one safety zone comprises a front safety zone in front of the self-propelled mobile unit, the front safety zone being calculated by forward travel of the mobile unit, and a rear safety zone behind the self-propelled mobile unit, the rear safety zone being calculated by traveling of the mobile unit in reverse.

12. The method according to claim 8, wherein the method further comprises the steps of: providing a cellularly structured map having cells, and determining occupied cells in the cellularly structured environment map which can be reached by movement of the mobile unit by the at least one safety interval.

13. The method according to claim 8, wherein the motion kinematics is a three-wheel kinematics.

14. The method according to claim 8, wherein the method further comprises route planning for the self-propelled mobile unit using the at least one safety interval to avoid collisions with obstacles by the self-propelled mobile unit.

15. A method for controlling a self-propelled mobile unit, comprising the steps of:

providing the self-propelled mobile unit with motion kinematics as a function of drive and steering properties of the mobile unit;

calculating via the motion kinematics a safety interval to be observed between the mobile unit, when moving, and an obstacle, the safety interval being prescribed as travel distance of the unit for traversing the safety interval;

providing a starting position and a starting steering angle of the self-propelled mobile unit;

calculating and noting for a plurality of steering angles between 0° and 360°, via the motion kinematics after at least forward travel of the mobile unit from the starting position and based on the safety interval as a constant travel distance, a final position of the self-propelled mobile unit; and determining, taking a contour line of the self-propelled mobile unit into consideration, a safety zone associated with the starting position of the self-propelled mobile unit as joined sets of areas that are framed by a contour line of respective final positions of the unit; and controlling the self-propelled mobile unit not to move closer to an obstacle than said safety interval.

16. The method according to claim 15, wherein the safety zone is calculated only once for a respective, prescribed safety interval and is carried along by the mobile unit when moving.

17. The method according to claim 15, wherein the safety zone comprises a front safety zone in front of the self-propelled mobile unit, the front safety zone being calculated by forward travel of the mobile unit, and a rear safety zone behind the self-propelled mobile unit, the rear safety zone being calculated by traveling of the mobile unit in reverse.

18. The method according to claim 15, wherein the method further comprises the steps of: providing a cellularly structured map having cells, and determining occupied cells in the cellularly structured environment map which can be reached by movement of the mobile unit by the safety interval.

19. The method according to claim 15, wherein the motion kinematics is a three-wheel kinematics.

20. The method according to claim 15, wherein the method further comprises route planning for the self-propelled mobile unit using the safety interval to avoid collisions with obstacles by the self-propelled mobile unit.

* * * * *